United States Patent Office 3,752,678
Patented Aug. 14, 1973

3,752,678
GEL-COATED FROZEN CONFECTION
Timothy John Jenkinson, St. Albans, and Tegwyn Pierce Williams, Great Doddington, near Wellingborough, England, assignors to Lever Brothers Company, New York, N.Y.
No Drawing. Filed Apr. 8, 1971, Ser. No. 132,546
Claims priority, application Great Britain, Apr. 20, 1970, 18,807/70
Int. Cl. A23g 5/00; A23l 1/04
U.S. Cl. 99—136                                7 Claims

ABSTRACT OF THE DISCLOSURE

A frozen foodstuff, particularly ice cream, is coated with an aqueous thixotropic gel based on a water soluble polysaccharide. The thixotropic gel may be an aliginate gel containing alkali metal ions and calcium or aluminium ions, or may be a gel based on Xanthan gum.

---

This invention relates to frozen foodstuffs, and is concerned with providing for such foodstuffs a protective coating which can be used as a vehicle for water-soluble flavouring, colouring, and the like.

According to the invention a frozen foodstuff is coated with an aqueous thixotropic gel based on a water-soluble polysaccharide.

The invention is applicable to a wide variety of frozen foodstuffs and particularly to frozen confectionery products, such as ice cream, water ices, iced milk, frozen sherbet, frozen custards and frozen mousse.

One example of the thixotropic gel suitable for use in the present invention, is an alginate gel containing alkali metal ions (sodium, potassium or ammonium ions) together with calcium or aluminium ions. Preferably the ions present in the alginate gel are sodium and calcium ions. Another example of a suitable gel is one based on the polysaccharide derived from Xanthomonas campestris. This has a molecular weight greater than 1 million and contains D-glucose units, D-mannose units and D-glucuronic acid units as its dominant monosaccharide units, and is commonly known as "Xanthan gum."

A thixotropic alginate gel is preferably prepared by first preparing a solution which incorporates both an alkali metal alginate and any other ingredients, such as flavours and buffering agents, which are to be present in the coating. A solution of a calcium or aluminium salt is then added to this solution, preferably under high shear conditions, and when the calcium or aluminium salt has been dispersed throughout the aliginate solution the solution is allowed to stand so that the thixotropic gel can develop.

The preferred type of alginate used is one which has a high molecular weight and a ratio of mannuronic acid units to guluronic acid units greater than 1. The alginate is preferably used at a concentration of 0.2% to 0.8% by weight, concentrations of about 0.2% being preferred when no buffering agents are incorporated in the thixotropic gel and concentrations of 0.4% or above being preferred when buffers are present.

If, as is preferred, the thixotropic alginate gel is to contain calcium ions, these can be incorporated in the form of a salt such as the chloride gluconate, lactate, citrate, tartrate, acetate or propionate; correspondingly aluminium salts such as aluminium sulphate and the edible alums may be used to incorporate aluminium ions. The amount of calcium or aluminium salt added is of course less than that required to form a rigid calcium or aluminium alginate gel, and can be determined by simple experiment. Usually from 18 to 100 mg. per litre of calcium ions are added, the proportion of calcium ions to alginate being 4.5 to 25 mg. of calcium ions per gram of alginate.

The amount of calcium ions required to form the thixotropic alginate gel varies with the type of alginate used; more calcium is required when the alginate contains a relatively high proportion of guluronic acid units. The presence of other substances, particularly electrolytes such as buffering agents, also necessitates the inclusion of more calcium to prepare a thixotropic gel. Buffers, for example citrates, containing ions capable of chelating with polyvalent metal ions have a more marked effect than non-chelating buffers. The amount of calcium required to form a thixotropic gel is lower at low temperatures than at high temperatures. For example, only about a quarter as much calcium is required at 5° C. as at 20° C. If, through the addition of too much calcium, too rigid a calcium alginate gel has been formed, the gelation may be partially reversed by the addition of a strong calcium-chelating agent such as sodium hexametaphosphate.

When the thixotropic gel used as coating is based on Xanthan gum, the concentration of polysaccharide in the gel may be as much as 0.4% by weight (when using the gel at ambient temperatures to coat a frozen foodstuff cooled by brine in conventional apparatus) or as little as 0.05% (using a gel at just above 0° C. to coat a foodstuff cooled by liquid nitrogen). The thixotropic gel containing Xanthan gum is easy to make; a convenient method is to mix together all the solid ingredients of the gel and to stir the resulting mixture into water under conditions of high shear.

The thixotropic gel used for coating may contain a sweetening agent, such as sucrose or glucose, or one or more flavouring agents, particularly fruit flavours, which may be used in conjunction with an acid buffer giving a pH in the range 3.5 to 4, preferably 3.5 to 3.7. Colouring agents can also be included if desired.

It will be appreciated that when the thixotropic gel is based on an alginate, the buffering, sweetening, flavouring, or colouring agents used should not contain any substantial amount of polyvalent metal ions for otherwise a rigid gel may be formed. Even the calcium ions present in hard tap water may interfere with the formation of a thixotropic alginate gel and close control is best achieved by using de-ionised, softened or distilled water when preparing the solutions required in making the gel.

The preferred method of coating is dip coating, particularly when the foodstuff to be coated is mounted on a stick. With an unmounted product a spiked conveyor ("comb conveyor") may be used to carry the ice cream or other product through the dipping bath. The ice cream or other product may be only partially dipped; by this means a product of attractive appearance such as a half-coated ice cream or an ice cream having a decorative feature distinctively coloured by a coating may be produced.

The temperature of the thixotropic gel when coating takes place is preferably near to 0° C. The foodstuff to be coated is preferably brought to a temperature well below 0° C., for example —20° C., before coating. It is desirable to freeze the coating as rapidly as possible after its formation and the coated foodstuff may be treated with a blast of cold air, for example air at —20° C., immediately after the coating process to accelerate freezing.

The thickness of the coating applied is suitably from 0.5 to 2.0 mm. If thicker coatings than this are desired, it is preferable to form them using more than one dipping step. After the coating process decorative or flavouring material may be fixed to the coating. For instance, when a coated ice cream is produced this may be further coated with chocolate strands or small edible decorative balls ("hundreds and thousands") before the coating is set. These materials adhere firmly to the coating during and after setting.

The following examples illustrate the application of the invention to the formation on ice cream of a coating which, being non-melting at room temperature, prevents ice cream drip, and which, although of adequate mechanical strength for handling and packing, is of a pleasant non-chewy texture and easily soluble on sucking.

EXAMPLE 1

A thixotropic alginate gel was prepared from the following ingredients:

| | |
|---|---|
| Citric acid monohydrate _____g__ | 80.0 |
| Sodium hydroxide _____g__ | 12.5 |
| Sucrose _____g__ | 1500 |
| Sodium alginate (high molecular weight rich in mannuronic acid) _____g__ | 40.0 |
| Strawberry flavour _____g__ | 107 |
| Colouring _____g__ | 1.08 |
| Calcium chloride hexahydrate solution (10% by weight) _____ml__ | 12.5 |
| De-ionised water _____litres__ | 10 |

The citric acid and sodium hydroxide were dissolved in the water to form a buffering system of pH 3.7. The sucrose and sodium alginate were mixed in the dry state and were then added slowly with constant stirring to the buffer solution. When these were fully dissolved the solution was cooled to 5° C. and the flavouring and colouring were added. With the mixture stirred under conditions of high shear, the calcium chloride solution was added, and when the calcium chloride had been thoroughly dispersed the mixture was transferred to a dipping bath and was left undisturbed.

The thixotropic gel that formed was kept at 5° C. and was used to coat ice creams mounted on a stick. The ice creams were suspended by their sticks from a conveyor and were dipped in the bath of thixotropic gel. The bath had an elongated shallow portion in the direction of motion for the conveyor which served as a dip tray. When they had been coated, the ice creams remained suspended over the drip tray for 18 seconds. No dripping occurred after the ice creams left the drip tray. Cold air at −18° C. was blown over the ice creams to harden the coating and then packed.

EXAMPLE 2

A thixotropic alginate gel was prepared from the following ingredients:

| | |
|---|---|
| Malic acid _____g__ | 4.0 |
| Sodium hydroxide solution (10% by weight) ml__ | 6.0 |
| Sodium alginate (high molecular weight) ___g__ | 2.0 |
| Sucrose _____g__ | 60.0 |
| Strawberry flavour (containing colouring) ___ml__ | 5.0 |
| Calcium chloride hexahydrate solution (10% by weight _____ml__ | 2.0 |
| De-ionised water _____ml__ | 500 |

The malic acid and sodium hydroxide were dissolved in the water to form a buffering system of pH 3.7. The sodium alginate and sucrose were mixed in the dry state and were added to the buffer system. The strawberry flavour and colouring were then added. The calcium chloride was then added to the solution (temperature 20 to 25° C.) with stirring under high shear conditions and the mixture was left undisturbed to form a thixotropic gel.

This thixotropic gel was used at room temperature (20 to 25° C.) as a bath for the manual dip-coating of ice creams (temperature at −20° C.) on sticks. Two coatings were applied successively.

EXAMPLE 3

A thixotropic gel based on "Xanthan gum" was prepared from the following ingredients:

| | Percentage by weight |
|---|---|
| Tap water _____ | 60.0 |
| Xanthan gum _____ | 0.3 |
| Sucrose _____ | 24.0 |
| Glucose _____ | 6.0 |
| Citric acid _____ | 1.0 |
| Sodium citrate _____ | 1.0 |
| Colouring and flavouring agents _____ | 7.7 |

The dry ingredients were thoroughly mixed and were then stirred into the water under high shear conditions. The resulting solution was pasteurised and was allowed to cool without agitation. A thixotropic gel developed which was used to coat ice creams under the conditions described in Example 1.

We claim:
1. A process for the preparation of a coated frozen confectionery product comprising the steps of:
   (i) dipping the frozen confectionery product into a thixotropic gel based on a water soluble polysaccharide to form a coating adhering to the frozen confectionery product, and
   (ii) allowing the coating to solidify in contact with the frozen confectionery product.
2. A process according to claim 1 in which the thixotropic gel is an alginate gel containing alkali metal ions and calcium or aluminium ions.
3. A process according to claim 2 in which the concentration of alginate in the thixotropic gel is 0.2% to 0.8% by weight.
4. A process according to claim 3 in which the thixotropic gel contains 4.5 to 25 mg. of calcium ions per gram of alginate.
5. A process according to claim 1 in which the thixotropic gel is based on Xanthan gum.
6. A process according to claim 5 in which the concentration of the polysaccharide in the thixotropic gel is 0.05% to 0.4% by weight.
7. A process according to claim 1 in which a blast of cold air is applied to the foodstuff after it has been coated to accelerate the solidifying of the coating.

References Cited

UNITED STATES PATENTS

| | | | |
|---|---|---|---|
| 2,763,557 | 9/1956 | Helgerud | 99—166 |
| 2,191,352 | 2/1940 | Oprean | 99—166 |
| 2,918,375 | 12/1959 | Gibsen | 99—131 |
| 3,232,929 | 2/1966 | McNeely et al. | 99—134 R |

ALVIN E. TANENHOLTZ, Primary Examiner

J. M. HUNTER, Assistant Examiner

U.S. Cl. X.R.

99—131, 166